United States Patent
Ilinich et al.

(10) Patent No.: US 11,698,090 B2
(45) Date of Patent: Jul. 11, 2023

(54) SURFACE FEATURES FOR LOCATING NET SUBSTRATE BUTTONS TO ENABLE SELF-PIERCING RIVETING (SPR) ON BRITTLE AND LOW TOUGHNESS MATERIALS

(71) Applicant: Ford Global Technologies, LLC, Dearborn, MI (US)

(72) Inventors: Andrey Ilinich, Novi, MI (US); Amanda Freis, Ann Arbor, MI (US); Garret Huff, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/965,340

(22) Filed: Oct. 13, 2022

(65) Prior Publication Data
US 2023/0037078 A1 Feb. 2, 2023

Related U.S. Application Data

(62) Division of application No. 15/926,378, filed on Mar. 20, 2018, now Pat. No. 11,499,581.

(51) Int. Cl.
| | | |
|---|---|---|
| B32B 3/30 | (2006.01) | |
| F16B 5/04 | (2006.01) | |
| B32B 7/08 | (2019.01) | |
| B32B 15/20 | (2006.01) | |
| B32B 15/08 | (2006.01) | |
| F16B 19/08 | (2006.01) | |

(52) U.S. Cl.
CPC ............ *F16B 5/04* (2013.01); *B32B 3/30* (2013.01); *B32B 7/08* (2013.01); *B32B 15/08* (2013.01); *B32B 15/20* (2013.01); *B32B 2605/08* (2013.01); *F16B 19/086* (2013.01)

(58) Field of Classification Search
CPC .. B32B 3/30; B32B 7/08; B32B 15/08; B32B 15/20; F16B 5/04; F16B 19/08; F16B 19/083; F16B 19/086
See application file for complete search history.

(56) References Cited

U.S. PATENT DOCUMENTS 6,842,962 B1 * 1/2005 Blacket ............... B21J 15/025
                                                        72/391.2
9,186,867 B2 * 11/2015 Campbell ............ B32B 15/08

* cited by examiner

*Primary Examiner* — Daniel J Wiley
(74) *Attorney, Agent, or Firm* — Burris Law, PLLC

(57) ABSTRACT

A method includes identifying a location of a locating feature disposed on an exterior profile of a lower substrate, the locating feature configured to identify a specified location of the exterior profile, positioning a self-piercing rivet along an upper substrate according to the identified location of the locating feature, and installing the self-piercing rivet through the upper substrate and into the lower substrate.

19 Claims, 6 Drawing Sheets

SURFACE FEATURES FOR LOCATING NET SUBSTRATE BUTTONS TO ENABLE SELF-PIERCING RIVETING (SPR) ON BRITTLE AND LOW TOUGHNESS MATERIALS

CROSS-REFERENCE TO RELATED APPLICATION

This application is a divisional of U.S. application Ser. No. 15/926,378, filed on Mar. 20, 2018, titled "SURFACE FEATURES FOR LOCATING NET SUBSTRATE BUTTONS TO ENABLE SELF-PIERCING RIVETING (SPR) ON BRITTLE AND LOW TOUGHNESS MATERIALS". The disclosure of the above application is incorporated herein by reference.

FIELD

The present disclosure relates to the joining of various materials in an assembly, and more particularly to accurately installing fasteners such as self-piercing rivets into workpieces/substrates of an assembly.

BACKGROUND

The statements in this section merely provide background information related to the present disclosure and may not constitute prior art.

As the automotive industry continues to focus on reducing the weight of vehicles to meet customer expectations on fuel economy and CAFE (Corporate Average Fuel Economy) requirements, interest in alternative materials including carbon fiber composite applications has increased. In body-in-white structures, joining methods have traditionally relied on resistance-spot welding (e.g., in steel structures).

In the case of aluminum intensive vehicles and other mixed metal joining applications, self-piercing rivet technology prevails. One advantage of self-piercing rivet technology is that it is a high production volume assembly process. Self-piercing rivet technology is compatible with adhesive and both methods can be used together. The substrate material must be ductile enough to form a "button", i.e., protrusion, which is the result of creating the joint and the necessary deformation to provide mechanical interlock.

Composite materials, such as carbon fiber, glass fiber or natural fiber composites, can be limited in application due to challenges relating to joining parts together. Frequently, these composites have limited ductility and are not well adapted to large displacements and deformation required to join parts together with self-piercing rivets. Other non-composite materials having higher strength and light weight are also often brittle and challenging to join using self-piercing rivet technology.

A challenge often faced with self-piercing rivet technology, however, is that the location of a site for rivet installation may be difficult to identify. This challenge is particularly exacerbated in high-volume automated production settings, in which it is desirable to make the joint with little or no impact on cycle time and equipment.

The issue of accurately locating rivet installation sites to join a variety of materials, and particularly in a high-volume production environment, is addressed by the present disclosure.

SUMMARY

In one form, a method of joining two substrates with a self-piercing rivet includes positioning an upper substrate, positioning a dimpled substrate adjacent to the upper substrate, the dimpled substrate including a preformed interior cavity, a preformed exterior profile adjacent the preformed interior cavity and defining a wall therebetween, and a locating feature configured to identify a location of the at least one preformed exterior profile, identifying a location of the locating feature, positioning an installation tool adjacent to the locating feature, and installing the self-piercing rivet through the upper substrate and into the dimpled substrate.

In variations of the method, which may be implemented individually or in combination: the locating feature is selected from the group consisting of surface texturing, laser marking, laser projection, ink application, dimpling, chemical etching, a notch located on an edge of the dimpled substrate, a hole through the dimpled substrate adjacent to the preformed exterior profile, an indent, a bead, and an embossment; the locating feature is identified on an exterior portion of the dimpled substrate opposite the upper substrate; the locating feature is at least one of: disposed on the preformed exterior profile, disposed adjacent to the preformed exterior profile, and a notch formed into the dimpled substrate away from the preformed exterior profile; the locating feature is formed into or protruding out of the exterior portion of the dimpled substrate; the wall defines a variable thickness; identifying the location of the locating feature with a vision system; engaging an insertion end of the self-piercing rivet with a bottom wall of the dimpled substrate.

In another form, a method of joining two substrates with a self-piercing rivet includes identifying a location of a locating feature disposed on an exterior profile of a lower substrate, the locating feature configured to identify a specified location of the exterior profile, positioning a self-piercing rivet along an upper substrate according to the identified location of the locating feature, and installing the self-piercing rivet through the upper substrate and into the lower substrate.

In variations of the method, which may be implemented individually or in combination: positioning the upper substrate adjacent to the lower substrate; the locating feature is selected from the group consisting of surface texturing, laser marking, laser projection, ink application, dimpling, chemical etching, a notch located on an edge of the lower substrate, a hole through the lower substrate adjacent to the exterior profile, an indent, a bead, and an embossment; the lower substrate further comprises an interior cavity, the exterior profile disposed adjacent the interior cavity and defining a wall therebetween; the locating feature is identified on an exterior portion of the lower substrate opposite the upper substrate; the locating feature is at least one of: disposed on the exterior profile, disposed adjacent to the exterior profile, and a notch formed into the lower substrate away from the exterior profile; the locating feature is formed into or protruding out of the exterior portion of the lower substrate; the locating feature is formed into the lower substrate by at least one of stamping, mechanical surface texturing, laser marking, laser projection, ink application, and chemical etching.

In another form, a method includes inserting a self-piercing rivet to an installation tool, positioning an upper substrate and a dimpled substrate adjacent to each other, the dimpled substrate including a preformed exterior profile defining a preformed interior cavity and a locating feature disposed on the dimpled substrate and configured to identify a location of the preformed exterior profile, identifying a location of the locating feature on the dimpled substrate, positioning the installation tool above the upper substrate based on the location of the locating feature, and actuating the installation tool to pierce the upper substrate with an insertion end of the self-piercing rivet and to move the insertion end into the preformed interior cavity of the dimpled substrate.

In variations of the method, which may be implemented individually or in combination: the locating feature is selected from the group consisting of surface texturing, laser marking, laser projection, ink application, dimpling, chemical etching, a notch located on an edge of the dimpled substrate, a hole through the dimpled substrate adjacent to the preformed exterior profile, an indent, a bead, and an embossment; the preformed exterior profile includes a peripheral wall and a bottom wall, the performed interior cavity defined between the peripheral wall and the bottom wall, and the method further comprises engaging the insertion end of the self-piercing rivet to the bottom wall; the locating feature is formed into or protruding out of the exterior portion of the dimpled substrate.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
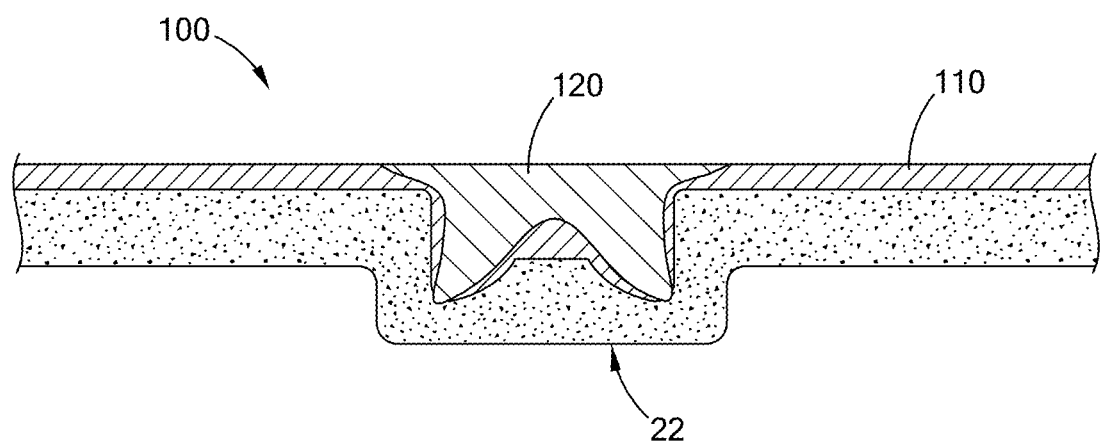
FIG. 1 is a cross-sectional view of an assembly having a self-piercing rivet (SPR) installed therein and constructed according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
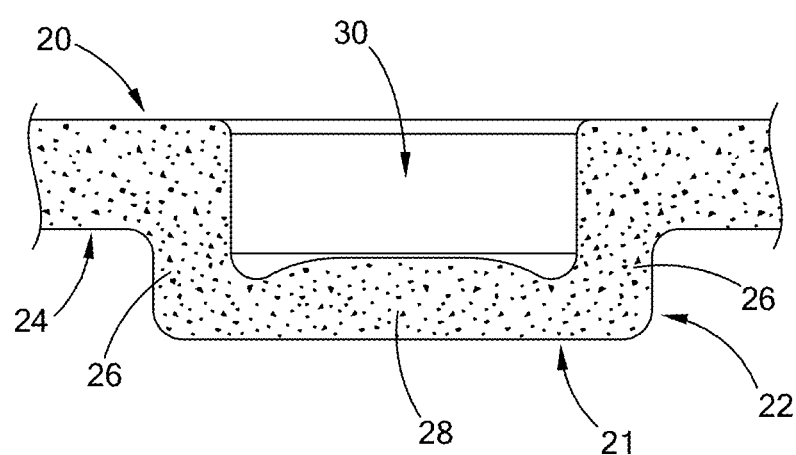
FIG. 2 is a cross-sectional view of a dimpled substrate from FIG. 1 constructed in accordance with the teachings of the present disclosure.

Referring to FIGS. 1 and 2, a dimpled substrate 20 for use in an assembly 100 having substrates joined by a self-piercing riveting (SPR) method is illustrated. Generally, the assembly 100 includes an upper substrate 110, the dimpled substrate 20, and a self-piercing rivet 120. Installation of self-piercing rivets 120 is described in greater detail in U.S. Pat. No. 9,828,040, which is commonly owned with the present application and the contents of which are incorporated herein by reference in their entirety.

The dimpled substrate 20 defines at least one preformed exterior profile 21 in the form of a button shaped protrusion or "button" 22. The button 22 extends downwardly from a lower surface 24 of the dimpled substrate 20 and is disposed in a predetermined location where a corresponding self-piercing rivet is to be inserted into the dimpled substrate 22, as described in greater detail below. The dimpled substrate 20 may be a cast part, a molded part, or a 3D-printed part, among others. In various forms of the present disclosure, the dimpled substrate 20 is an aluminum casting, an aluminum extrusion, or a composite material. It should be understood that these materials and methods of forming are merely exemplary and should not be construed as limiting the scope of the present disclosure.

The button 22 of the dimpled substrate 20 in this form is generally an open cylindrical shape having a peripheral wall 26 and a bottom wall 28. The exterior surfaces of the peripheral wall 26 and the bottom wall 28 together define the preformed exterior profile 21 as shown. The dimpled substrate 20 also includes a preformed interior cavity 30. The preformed interior cavity 30 is configured to receive a fastening system, such as the self-piercing rivet 120, which may or may not be plastically deformed after installation, as described in greater detail below.

In one form, the bottom wall 28 of the button 22 may define a variable thickness as shown. Details regarding the variable thickness of the bottom wall 28, among other features of the dimpled substrate 20, is shown and described in U.S. patent application Ser. No. 15/726,172, which is commonly owned with the present application, and the contents of which are incorporated herein by reference in its entirety.

Referring to FIGS. 2A-4C, the dimpled substrate 20 further includes at least one locating feature 32 configured to identify a location of the preformed exterior profile 21, and also the button 22 and its interior cavity 30, for more accurate location of the self-piercing rivet 120 during installation. Generally, the locating feature 32 may be on or near the preformed exterior profile 21 to identify the location for installation of the self-piercing rivet 120. The locating feature 32 may be a physical material applied to the dimpled substrate 20, a physical feature formed into or on the dimpled substrate 20, or an optical projection onto the dimpled substrate 20, among others. Examples of each of these forms of a locating feature 32 are provided in greater detail below but should not be construed as limiting the scope of the present disclosure. The inventors have discovered that many forms of providing the locating feature 32 can be realized in a variety of methods and thus the various forms illustrated and described herein are merely exemplary and should not be construed as limiting the scope of the present disclosure In FIGS. 2A-2C, the locating feature 32 is disposed on a bottom surface 34 of the bottom wall 28 of the preformed exterior profile 21 according to one form of the present disclosure. The locating feature 32 may be made in an initial manufacturing process step when the dimpled substrate 20 is formed, such as for example during casting or in a stamping die. More specifically, the locating feature 32 may be stamped into the bottom surface 34, causing limited plastic deformation of the material of the dimpled substrate 20 in order to create a location that can be detected my manual, optical, or other automated methods as set forth below. The locating feature 32 may take the form of those shown, or any number of geometrical shapes such as a dimple, an indent, a bead, or an embossment. Alternatively, the locating feature 32 may be applied during a post process step after the button 22 is formed, such as by way of example mechanical surface texturing, laser marking, laser projection (no modification of button or application of any additional material), ink application/stamping, or chemical etching, among others.

Figure 2A:
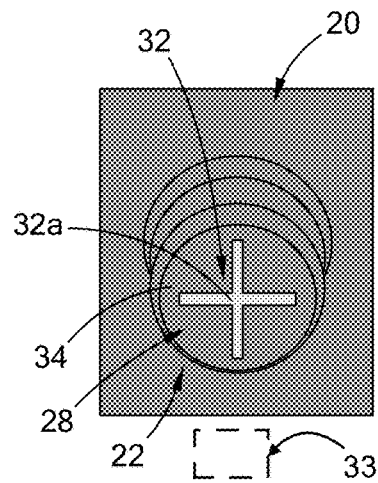
FIGS. 2A-2C are bottom views of a dimpled substrate having a locating feature on a bottom surface of a button according to the present disclosure.

Referring specifically to FIG. 2A, the locating feature defines a cross 32a comprising two intersecting lines generally perpendicular to each other, which can be detected by a vision system 33, for example. Once the locating feature 32a is detected, the location of the preformed exterior profile 21, and also the button 22 and its interior cavity 30, is identified to accurately position an installation tool above the dimpled substrate 20, as described in further detail below. Although the locating feature 32a is illustrated as a cross-shaped feature, the present disclosure is not limited to a cross 32a and other geometrical figures or shapes may be employed while remaining within the scope of the present disclosure.

Figure 2B:
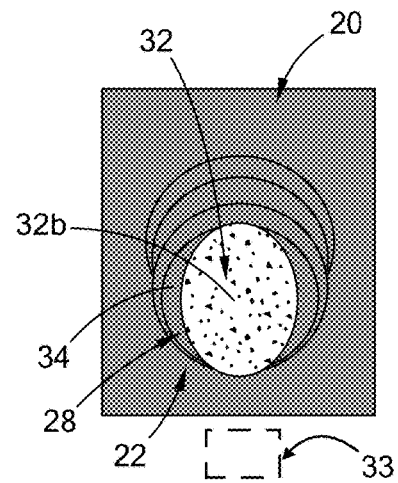

Referring to FIG. 2B, a locating feature 32b is in the form of surface texturing in a predetermined area along the preformed exterior profile 21 of the button 22. The surface texturing 32b can be detected by a vision system 33 or other automated or mechanical means to identify the location of the preformed exterior profile 21, and hence the button 22 and its interior cavity 30.

Figure 2C:
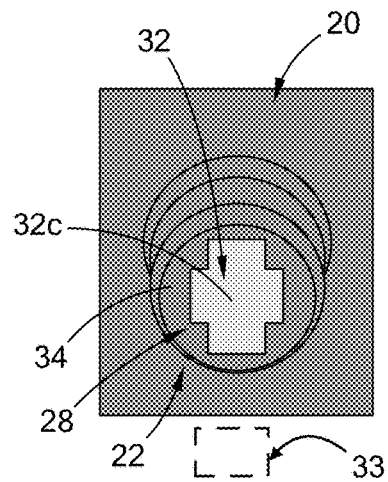

Referring to FIG. 2C, instead of the locating feature 32 being made in an initial processing step, the locating feature 32c is formed in a post-processing step, such as for example an additional stamping process, laser marking, laser projection, or ink application, among others. In this example, after the dimpled substrate 20 is formed, an ink applicator is used to apply a marking, which in this form is another cross-shaped feature. The locating feature 32c is then detected by an auxiliary system, such a vision system 33 or other manual or automated methods to determine the location of the preformed exterior profile 21, and hence the button 22 and its interior cavity 30 for more accurate installation of the self-piercing rivet 120.

Figure 3A:
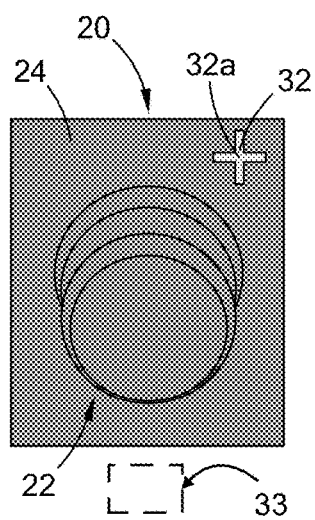
FIGS. 3A-3C are bottom views of a dimpled substrate having a locating feature next to a button according to the present disclosure.
Figure 3B:
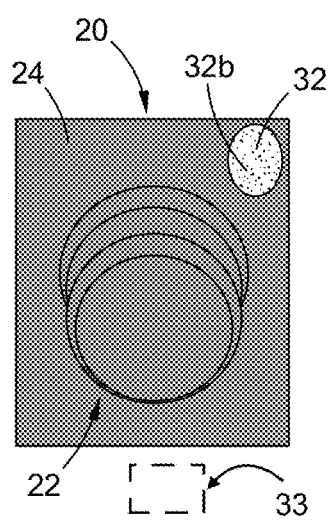
Figure 3C:
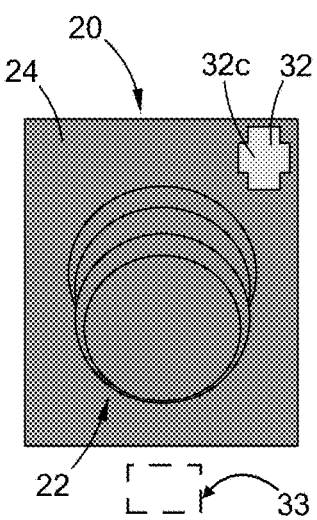

Referring to FIGS. 3A-3C, the locating feature 32', according to another form of the present disclosure is illustrated in which the locating feature 32a', 32b', and 32c' are disposed adjacent to, instead of directly on, the preformed exterior profile 21 on the lower surface 24 of the dimpled substrate 20. In this form, the locating feature 32 and the button 22 are preferably formed in the same processing step in order to maintain proper tolerances on the location of the button 22 from one button 22 to another.

Figure 4A:
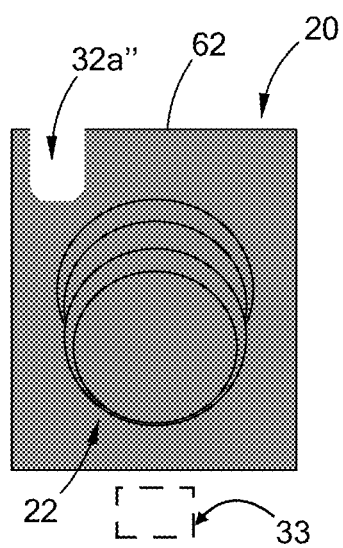
FIGS. 4A-4C are bottom views of a dimpled substrate having a locating feature notched into the lower substrate according to the present disclosure.
Figure 4B:
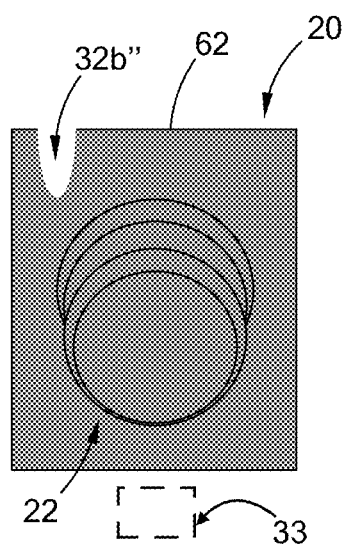
Figure 4C:
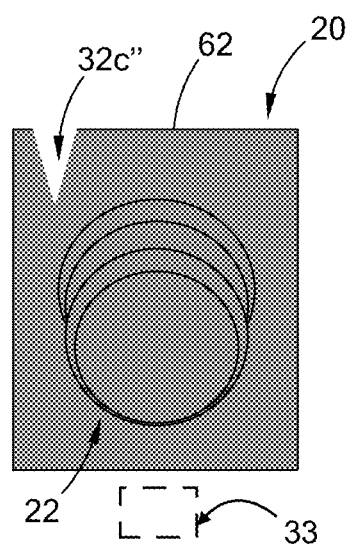

In some instances, providing a locating feature on or near the button 22 is not desired due to a subsequent manufacturing step that may mask the locating feature, such as, for example, a coating step. Therefore, as illustrated in FIGS. 4A-4C, the present disclosure provides a locating feature in the form of a notch 32" formed into the dimpled substrate 20 away from the button 22. The notch 32" is shown as being formed on an edge 62 of the dimpled substrate 20, however, should not be construed as limiting the present disclosure and thus the notch 32" may be formed in any location about the dimpled substrate 20 that allows the locating feature to be detected after subsequent manufacturing steps such as coating have been completed. The notch 32" may define any geometric shape that allows the notch 32" to be detected, such as rectangular (FIG. 4A), oval (FIG. 4B), and triangular (FIG. 4C). Just as the locating feature 32' disposed adjacent to the button 22 discussed above, it is desired to create the notch 32" and the button 22 simultaneously in order to maintain proper tolerances on locations of the notches 32" from button 22 to button 22.

Figure 5:
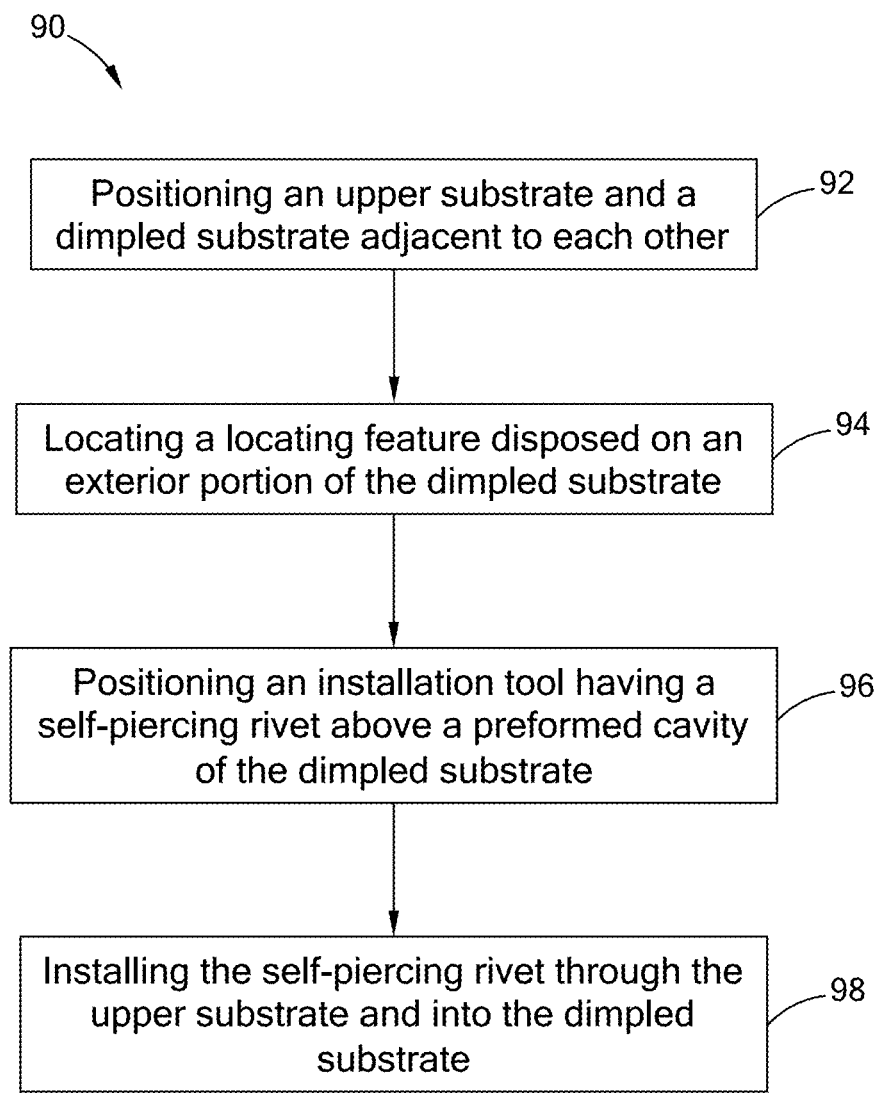
FIG. 5 is a flow chart illustrating a method of locating a feature for installation of a self-piercing rivet according to the present disclosure.

Referring to FIG. 5, a method 90 of locating a feature for installation of a self-piercing rivet is provided by the present disclosure. At step 92, an upper substrate is positioned and a dimpled substrate is positioned adjacent to the upper substrate, the dimpled substrate comprises at least one preformed interior cavity, at least one preformed exterior profile adjacent to the interior cavity and defining a wall therebetween, and at least one locating feature configured to identify a location of the preformed exterior profile. At step 94, a location of the preformed exterior profile of the dimpled substrate is accurately determined by identifying a location of the locating feature. Thus, at step 96, accurate positioning of an installation tool having at least one self-piercing rivet above the preformed interior cavity of the dimpled substrate is accomplished. At step 98, the self-piercing rivet is installed through the upper substrate and into the dimpled substrate.

Figure 6:
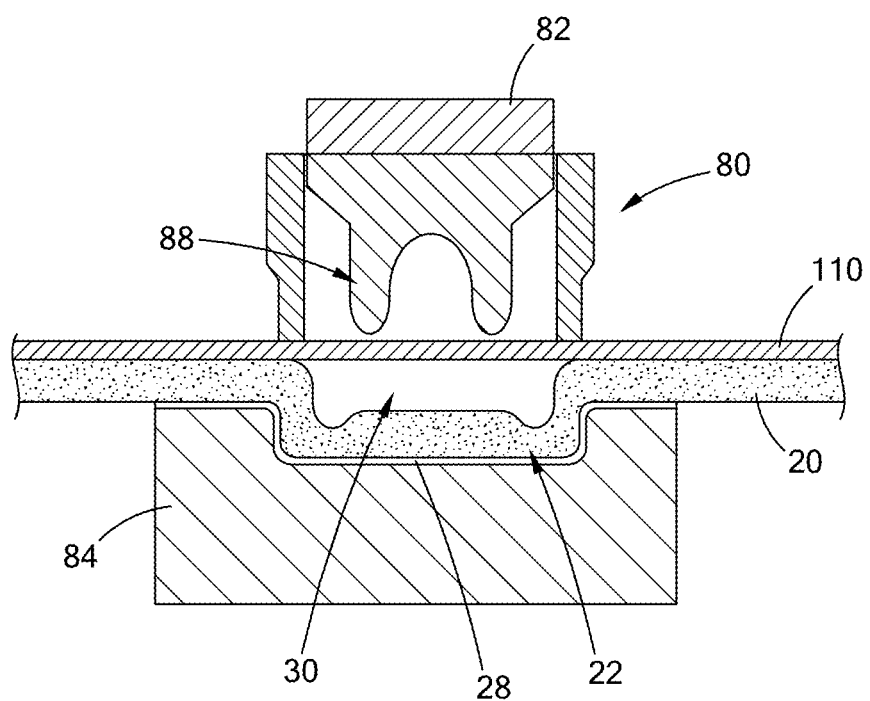
FIG. 6 is a cross-sectional view of an upper substrate and a dimpled substrate with a self-piercing rivet tool positioned to drive a self-piercing rivet into the upper substrate and the dimpled substrate.

As best shown in FIG. 6, to join the dimpled substrate 20 to the upper substrate 110, the upper substrate 110 is positioned adjacent to or over the dimpled substrate 20 in a self-piercing rivet tool 80. The self-piercing rivet 120 is placed inside the self-piercing rivet tool 80 and a location of the locating feature 32 is identified by an auxiliary system such as a vision system 33 (FIGS. 2A-4C), or other mechanical or automated system. Once the locating feature 32 is identified, the self-piercing rivet tool 80 is positioned adjacent to the locating feature 32. In other words, the self-piercing rivet 120 is placed inside the self-piercing rivet tool 80 and immediately above the preformed interior cavity 30 of the dimpled substrate 20 based on the identified location of the locating feature 32.

As further shown, the self-piercing rivet 120 has an insertion end 88 to pierce through the upper substrate 110 and to be inserted into the preformed interior cavity 30 of the dimpled substrate 20 to engage the bottom wall 28 of the button 22. It should be understood that the dimpled substrate 20 and the upper substrate 110 may be arranged in any orientation while still remaining within the scope of the present disclosure.

Because the locating feature allows for accurately identifying the location of the preformed button, the self-piercing riveting tool can be positioned such that the self-piercing rivet can be installed directly into the preformed interior cavity of the dimpled substrate while maintaining proper tolerances. Thus, accurate joining of brittle material or low-strain material to other materials using self-piercing rivet technology in a high volume automated production setting is accomplished with little or no impact on cycle time and equipment. It should also be understood that the locating feature of the present disclosure may be used in any application which requires joining of two or more layers of materials.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of joining two substrates with a self-piercing rivet, the method comprising:
   positioning an upper substrate;

positioning a dimpled substrate adjacent to the upper substrate so that an upper surface of the dimpled substrate faces toward the upper substrate and a lower surface faces away from the upper substrate, the dimpled substrate comprising:
- a preformed interior cavity defined in the upper surface of the dimpled substrate;
- a preformed exterior profile extending from the lower surface of the dimpled substrate, the preformed exterior profile being adjacent the preformed interior cavity and defining a wall therebetween; and
- a locating feature configured to identify a location of the at least one preformed exterior profile and visible when the dimpled substrate is positioned adjacent to the upper substrate;

identifying a location of the locating feature using an automated vision system;
positioning an installation tool adjacent to the locating feature; and
installing the self-piercing rivet through the upper substrate and into the dimpled substrate.

2. The method of claim 1, wherein the locating feature is selected from the group consisting of surface texturing, laser marking, laser projection, ink application, dimpling, chemical etching, a notch located on an edge of the dimpled substrate, a hole through the dimpled substrate adjacent to the preformed exterior profile, an indent, a bead, and an embossment.

3. The method of claim 1, wherein the locating feature is identified on an exterior portion of the dimpled substrate opposite the upper substrate.

4. The method of claim 3, wherein the locating feature is at least one of: disposed on the preformed exterior profile, disposed adjacent to the preformed exterior profile, and a notch formed into the dimpled substrate away from the preformed exterior profile.

5. The method of claim 1, wherein the locating feature is formed into or protruding out of the exterior portion of the dimpled substrate.

6. The method of claim 1, wherein the wall defines a variable thickness.

7. The method of claim 1, further comprising engaging an insertion end of the self-piercing rivet with a bottom wall of the dimpled substrate.

8. A method of joining two substrates with a self-piercing rivet, the method comprising:
identifying, via an automated vision system, a location of a locating feature disposed on a lower substrate, the lower substrate including an exterior profile, the locating feature configured to identify a specified location of the exterior profile;
positioning a self-piercing rivet along an upper substrate according to the identified location of the locating feature; and
installing the self-piercing rivet through the upper substrate and into the lower substrate.

9. The method of claim 8, further comprising positioning the upper substrate adjacent to the lower substrate.

10. The method of claim 8, wherein the locating feature is selected from the group consisting of surface texturing, laser marking, laser projection, ink application, dimpling, chemical etching, a notch located on an edge of the lower substrate, a hole through the lower substrate adjacent to the exterior profile, an indent, a bead, and an embossment.

11. The method of claim 8, wherein the lower substrate further comprises an interior cavity, the exterior profile disposed adjacent the interior cavity and defining a wall therebetween.

12. The method of claim 8, wherein the locating feature is identified on an exterior portion of the lower substrate opposite the upper substrate.

13. The method of claim 12, wherein the locating feature is at least one of: disposed on the exterior profile, disposed adjacent to the exterior profile, and a notch formed into the lower substrate away from the exterior profile.

14. The method of claim 8, wherein the locating feature is formed into or protruding out of the exterior portion of the lower substrate.

15. The method of claim 8, wherein the locating feature is formed into the lower substrate by at least one of stamping, mechanical surface texturing, laser marking, laser projection, ink application, and chemical etching.

16. A method for joining two substrates, the method comprising:
inserting a self-piercing rivet to an installation tool;
positioning an upper substrate and a dimpled substrate adjacent to each other so that an upper surface of the dimpled substrate opposes the upper substrate and a lower surface of the dimpled substrate faces away from the upper substrate, the dimpled substrate comprising:
- a preformed exterior profile that extends away from the upper substrate and defines a preformed interior cavity open toward the upper substrate; and
- a locating feature disposed on the dimpled substrate and configured to identify a location of the preformed exterior profile and visible when the dimpled substrate is positioned adjacent to the upper substrate;

identifying, with an automated vision system, a location of the locating feature on the dimpled substrate;
positioning the installation tool above the upper substrate based on the location of the locating feature; and
actuating the installation tool to pierce the upper substrate with an insertion end of the self-piercing rivet and to move the insertion end into the preformed interior cavity of the dimpled substrate.

17. The method of claim 16, wherein the locating feature is selected from the group consisting of surface texturing, laser marking, laser projection, ink application, dimpling, chemical etching, a notch located on an edge of the dimpled substrate, a hole through the dimpled substrate adjacent to the preformed exterior profile, an indent, a bead, and an embossment.

18. The method of claim 16, wherein the preformed exterior profile includes a peripheral wall and a bottom wall, the performed interior cavity defined between the peripheral wall and the bottom wall, and the method further comprises engaging the insertion end of the self-piercing rivet to the bottom wall.

19. The method of claim 16, wherein the locating feature is formed into or protruding out of the exterior portion of the dimpled substrate.

* * * * *